US008345785B2

(12) United States Patent
Hayase

(10) Patent No.: US 8,345,785 B2
(45) Date of Patent: Jan. 1, 2013

(54) WIRELESS DATA COMMUNICATION SYSTEM AND WIRELESS DATA COMMUNICATION METHOD

(75) Inventor: Shigenori Hayase, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 930 days.

(21) Appl. No.: 11/211,616

(22) Filed: Aug. 26, 2005

(65) Prior Publication Data

US 2006/0198461 A1    Sep. 7, 2006

(30) Foreign Application Priority Data

Mar. 2, 2005   (JP) ................. 2005-057206

(51) Int. Cl.
*H04B 7/02* (2006.01)
*H04L 1/02* (2006.01)
(52) U.S. Cl. ..................................... 375/267
(58) Field of Classification Search ............ 375/267
See application file for complete search history.

(56) References Cited

U.S. PATENT DOCUMENTS

| | | | | |
|---|---|---|---|---|
| 7,099,678 | B2* | 8/2006 | Vaidyanathan | 455/500 |
| 2002/0191535 | A1* | 12/2002 | Sugiyama et al. | 370/208 |
| 2004/0171385 | A1* | 9/2004 | Haustein et al. | 455/450 |
| 2004/0179627 | A1* | 9/2004 | Ketchum et al. | 375/267 |
| 2004/0203547 | A1* | 10/2004 | Lo et al. | 455/132 |
| 2005/0095996 | A1* | 5/2005 | Takano | 455/91 |
| 2006/0098600 | A1* | 5/2006 | Cheng | 370/335 |
| 2007/0082623 | A1* | 4/2007 | Mattheijssen et al. | 455/101 |

OTHER PUBLICATIONS

Kei Sakaguchi, Seeho Ting, Kiyomichi Araki, Initial measurement of MIMO Eigenmode Communication System, the IEEE, B vol. j 87-B No. 9, pp. 1454-1466, Sep. 9, 2004, pp. 1-46.*
"A Study on the Influence of RF Unit on MIMO System Performance" by H. Kamata, et al., 2004 Communications Society Conference, The Institute of Electronics, Information and Communication Engineers., p. 357.
"Initial Measurement of MIMO Eigenmode Communications System" by Kei Sakaguchi, et al., The Institute of Electronics, Information and Communication Engineers Transactions, B vol. J87-B No. 9, pp. 1454-1466, Sep. 9, 2004.

* cited by examiner

*Primary Examiner* — David C. Payne
*Assistant Examiner* — Tanmay Shah
(74) *Attorney, Agent, or Firm* — Brundidge & Stanger, P.C.

(57) ABSTRACT

In MIMO transmission between M transmission antennas and N reception antennas, a transmission signal vector is set as a vector having 2M elements comprising in-phase components and quadrature components of M complex signals, a reception signal vector is set as a vector having 2N elements comprising in-phase components and quadrature components of N complex signals, and a transfer matrix is set as a real matrix comprising 2N rows and 2M columns. Then, a transfer matrix containing IQ mismatch is obtained based on a training signal, thereby executing MIMO encoding and decoding. For learning of the transfer matrix, a training signal which has two linearly-independent signal points on a constellation for each of the transmission antennas is used. With such an arrangement, in MIMO transmission, IQ mismatch in a quadrature modulator and a quadrature demodulator can be compensated and a bit error rate can be improved.

6 Claims, 9 Drawing Sheets

WIRELESS DATA COMMUNICATION SYSTEM AND WIRELESS DATA COMMUNICATION METHOD

CLAIM OF PRIORITY

The present application claims priority from Japanese application JP 2005-057206, filed on Mar. 2, 2005, the content of which is hereby incorporated by reference into this application.

FIELD OF THE INVENTION

The present invention relates to a wireless data communication system and a wireless data communication method, and more specifically to a wireless data communication system and a method for wireless data communication which is suitably used for MIMO (Multiple-Input Multiple-Output) communication, which receives wireless data from a plurality of transmission antennas by using a plurality of reception antennas.

BACKGROUND OF THE INVENTION

With conventional wireless communication systems, to improve reception sensitivity, a technology to transmit a signal from a transmitter by using a plurality of antennas and a technology to receive a signal by using a plurality of antennas are employed. These technologies are called "beam forming" or "diversity."

The beam forming or the diversity technology can reduce deterioration in transmission characteristics caused by noise or interference in order to improve reception sensitivity; however, they are less effective in enhancing a transmission rate.

In contrast, a technology (MIMO) is proposed which can enhance a transmission rate and offers an effect of further improvement in reception sensitivity by using a plurality of antennas.

For example, at IEEE 802.11 which is working on standardization of wireless LAN, a system exceeding 100 Mbps is currently discussed in the task group n, and it is almost certain that MIMO will be adopted. In addition, for the fourth generation mobile communication system, adoption of MIMO is now examined to increase the transmission rate.

However, in building a MIMO transmission system, there is a problem in that IQ mismatch in a quadrature modulator and a quadrature demodulator causes significant impact, thus deteriorating transmission characteristics, as shown in the following non-patent references 1 and 2. The term IQ mismatch means that the respective amplitude conversion rates of an in-phase component and a quadrature component (which correspond to a real part and an imaginary part, respectively, of a complex signal) of a complex signal become different from each other, or the phase difference between the components is away from 90 degrees.

[Non-Patent Reference 1]
Hiroyuki Kamata, Kei Mizutani, Hiraku Sakaguchi, Kiyomichi Araki, "Studies on Characteristic Deterioration of a MIMO Communication System Caused by Incompleteness in the RF System", Society Convention 2004 B-5-23, The Institute of Electronics, Information and Communication Engineers

[Non-Patent Reference 2]
Hiraku Sakaguchi, Tin Zi Ho, Kiyomichi Araki, "Building of a MIMO Eigen Mode Transmission System and Result of Measurement and Experiments", The Institute of Electronics, Information and Communication Engineers, Transactions B, vol. J87-B, no. 9, pp. 1454-1466, 2004

SUMMARY OF THE INVENTION

Hereinafter, the principle of a MIMO system will be described first with reference to FIG. 1.

FIG. 1 is a diagram describing the principle of a general MIMO system.

A MIMO transmitter 101 distributes transmit data to M transmission antennas 102, thus forming transmission signal vector $x=(x(1), x(2), \ldots, x(M))^T$. An MIMO receiver 104 receives the signal through N reception antennas 103, thus forming reception signal vector $y=(y(1), y(2), \ldots, y(N))^T$. When the signal is delivered to a reception antenna 103-$j$ from a transmission antenna 102-$i$, the signal is multiplied by $H_{ij}$ due to attenuation in amplitude and phase rotation. When a transfer matrix H having the $H_{ij}$ as an element is used, transmission of the signal can be expressed by the following equation 1:

$$y=Hx \qquad \text{(Equation 1)}$$

Here, the signal vectors x and y as well as the transfer matrix H can be each expressed in a complex number.

Further, when M is equal to N, the transmit signal vector x can be restored from the reception signal vector y by the following equation 2 (ZF system: Zero Forcing).

$$x=H^{-1}y \qquad \text{(Equation 2)}$$

The above-stated ZF system requires that M should be equal to N. However, it is not in general required that M is equal to N. In this case, the signal can be restored by using, for example, an eigen mode transmission system shown below. The matrix H can be expanded like the following equation 3 by applying the singular value decomposition.

$$H=U\Lambda V^H \qquad \text{(Equation 3)}$$

Here, V shows a unitary matrix of row M and column M, U shows a unitary matrix of row N and column N, and $V^H$ shows a Hermitian transpose of the matrix V. Symbol $\Lambda$ shows a matrix of row N and column M where the diagonal section will be a singular value of H, that is, a square root of the eigen value of $HH^H$, and other sections will be zero. By using the above-stated relationship, conversion of the matrix V is applied to a signal before being transmitted, and conversion of a matrix $U^H$ is applied to the signal after being received. At this time, the reception signal can be expressed in the following equation 4:

$$y=U^H HVx=U^H U\Lambda V^H Vx=\Lambda x \qquad \text{(Equation 4)}$$

As stated above, the conversion is performed by using a matrix that has a diagonal section only as expressed by the righthand-most side of equation 4, it is possible to restore the transmission signal from the reception signal.

In addition to the above-stated ZF system and the eigen mode transmission system, the transmission signal can also by restored by using the maximum likelihood detection system, the space-time coding system or the like.

The restoration of the transmission vector x requires the transfer matrix H. Therefore, in order to execute data transfer, it is necessary to transmit a training signal configured with a known signal that is defined between a transmitter and a receiver in advance, and the transfer matrix H is obtained in the receiver. With a wireless LAN, the IEEE 802.11a requires arrangement of a training signal for use with carrier frequency synchronization or timing adjustment at the beginning of a data frame, and therefore, for the IEEE 802.11n, it is now examined to additionally arrange a MIMO training signal. The training signal uses a BPSK (Binary Phase Shift Keying) modulation signal.

By using the above-stated method, when situation is ideal, MIMO enables to realize a transmission rate min (M,N) times as much the case where a signal is transmitted from a transmission antenna and is received by a reception antenna (SISO: Single-Input Single-Output).

However, in building a MIMO transmission system, there is a problem in that IQ mismatch in a quadrature modulator and a quadrature demodulator causes significant impact, thus deteriorating transmission characteristics, as shown in the above-stated non-patent references 1 and 2.

Hereinafter, IQ mismatch will be described with reference to FIGS. 2 and 3.

FIG. 2 is a demonstrative diagram of a quadrature modulator and a quadrature demodulator in a MIMO transmitter and a MIMO receiver, respectively, according to the prior art shown in FIG. 1.

FIG. 3 is a diagram showing distortion of a transmission signal caused by IQ mismatch in constellation of a quadrature phase shift keying (QPSK) modulation signal. This constellation is a plane with a coordinate system formed by two coordinate axes that cross orthogonally each other (the abscissa axis is Axis I and the ordinate axis is Axis Q in the example in FIG. 3) when I (in-phase component) and Q (quadrature component) are expressed by the two coordinate axes.

In the MIMO transmitter 101, processes such as serial-parallel conversion, error correction coding and interleaving are first executed in a MIMO modulator 107, and then a signal is converted to a complex number. Here, MIMO encoding is executed and complex signals as many as the number of transmission antennas are output. Since a complex signal is expressed with two components of an in-phase component and a quadrature component, two component outputs exist for each complex signal. The complex signal is converted in a quadrature modulator 105 to a signal whose center frequency will be the frequency of a wireless wave and is then output by M transmission antennas 102. In a receiving unit, a signal received by N reception antennas 103 is converted by a quadrature demodulator in the MIMO receiver 104 to a baseband signal and a complex signal comprising two in-phase and quadrature components is delivered to an MIMO demodulator 108. In the MIMO demodulator 108, MIMO decoding is executed on complex signals available as much as the number of reception antennas, and subsequently, de-interleaving, decoding of error correction code and parallel-serial conversion are applied before restoring the data. Here, the MIMO encoding executed in the MIMO demodulator 107 and the MIMO decoding executed in the MIMO demodulator are carried out based on the complex transfer matrix H of row N and column M. Here, IQ mismatch that occurs in the quadrature modulator 105 and the quadrature demodulator 106 creates a problem.

FIG. 3 shows how a complex signal is deteriorated by IQ mismatch, wherein the abscissa axis shows in-phase components and the ordinate axis shows quadrature components to compare a QPSK modulation signal (white circles) for an ideal case and a signal distorted by IQ mismatch (black circles). As shown here, distortion occurs on the complex signal, which deteriorates transmission characteristics. Deterioration caused by IQ mismatch can occur equivalently in either the quadrature modulator or the quadrature demodulator if the mismatch level is equivalent.

IQ mismatch will also deteriorate characteristics in SISO, but it becomes more apparent in MIMO. In the quadrature modulator 105 in FIG. 2, signals affected by distortion due to IQ mismatch will have been mixed in the air during transmission. In addition, at the time of reception, the signals will be further affected by IQ mismatch in the quadrature demodulator 106 and will be mixed during the MIMO decoding process. Although, normally, the bit error rate (BER) becomes smaller as the signal to noise ratio (SNR) becomes larger, such accumulated IQ mismatch causes a phenomenon in which BER will not become smaller beyond a certain value.

The present invention has been made to solve the above-stated problems, and it is an object of the present invention is to provide an MIMO data communication system that can reduce IQ mismatch generated in MIMO communication that employs a quadrature demodulation system.

The following shows a typical example of the present invention. More specifically, a wireless data communication system according to the present invention executes data communication between a transmitter having M transmission antennas and a receiver having N reception antennas. The transmitter includes a modulator that modulates a transmission signal associated with each of transmission antennas and the receiver includes a demodulator that demodulates a reception signal from each of reception antennas. A training signal is transmitted to the receiver from the transmitter. Based on an in-phase component and a quadrature component of M transmission signal vectors, and an in-phase component and a quadrature component of N transmission signal vectors, an arithmetic operation is performed on a 2N-row-2M-column transfer matrix which shows a relationship between a transmission signal vector and a reception signal vector which each contain deviation in an in-phase component and deviation in a quadrature component that occur during a modulation process in said modulator and deviation in an in-phase component and deviation in a quadrature component that occurs during a demodulation process in said demodulator. After the training signal is transmitted, according to data to be transmitted to said receiver from said transmitter, an arithmetic operation is performed on the in-phase component and the quadrature component to be input to said demodulator based on said transfer matrix.

The MIMO data communication system according to the present invention is a system which carries out data communication between a transmitter which has M transmission antennas and includes a modulator and a quadrature modulator that performs quadrature modulation on a transmission signal associated with each of the transmission antennas, and a receiver which has N reception antennas and includes a demodulator and a quadrature demodulator that performs quadrature demodulation on a reception signal from each of the reception antennas.

In the system configured as above, first, a training signal is transmitted to the receiver from the transmitter.

At the receiver, based on an in-phase component and a quadrature component of M transmission signal vectors, and an in-phase component and a quadrature component of N reception signal vectors, an arithmetic operation is performed on a 2N-row-2M-collumn transfer matrix that shows the relationship between a transmission signal vector and a reception signal vector which each contain deviation in the in-phase components and deviation in the quadrature components of the modulator to be generated during a modulation process as well as deviation in the in-phase components and deviation in the quadrature components of the demodulator to be generated during a demodulation process. The transfer matrix according to the present invention is characterized in that the transfer matrix is represented by using an in-phase component and a quadrature component that contain IQ mismatch, whereas the prior art transfer matrix was represented by using a complex component.

Then, after the training signal is transmitted, according to data to be transmitted to the receiver from the transmitter, an arithmetic operation is carried out on the in-phase and the quadrature components to be input to the demodulator based on the transfer matrix.

DETAILED DESCRIPTION OF THE PREFERRED EMBODIMENTS

Hereinafter, preferred embodiments according to the present invention will be described with reference to FIGS. 4 to 11.

[First Embodiment]

Hereinafter, a first preferred embodiment according to the present invention will be described with reference to FIG. 4 to 7.

Figure 4:
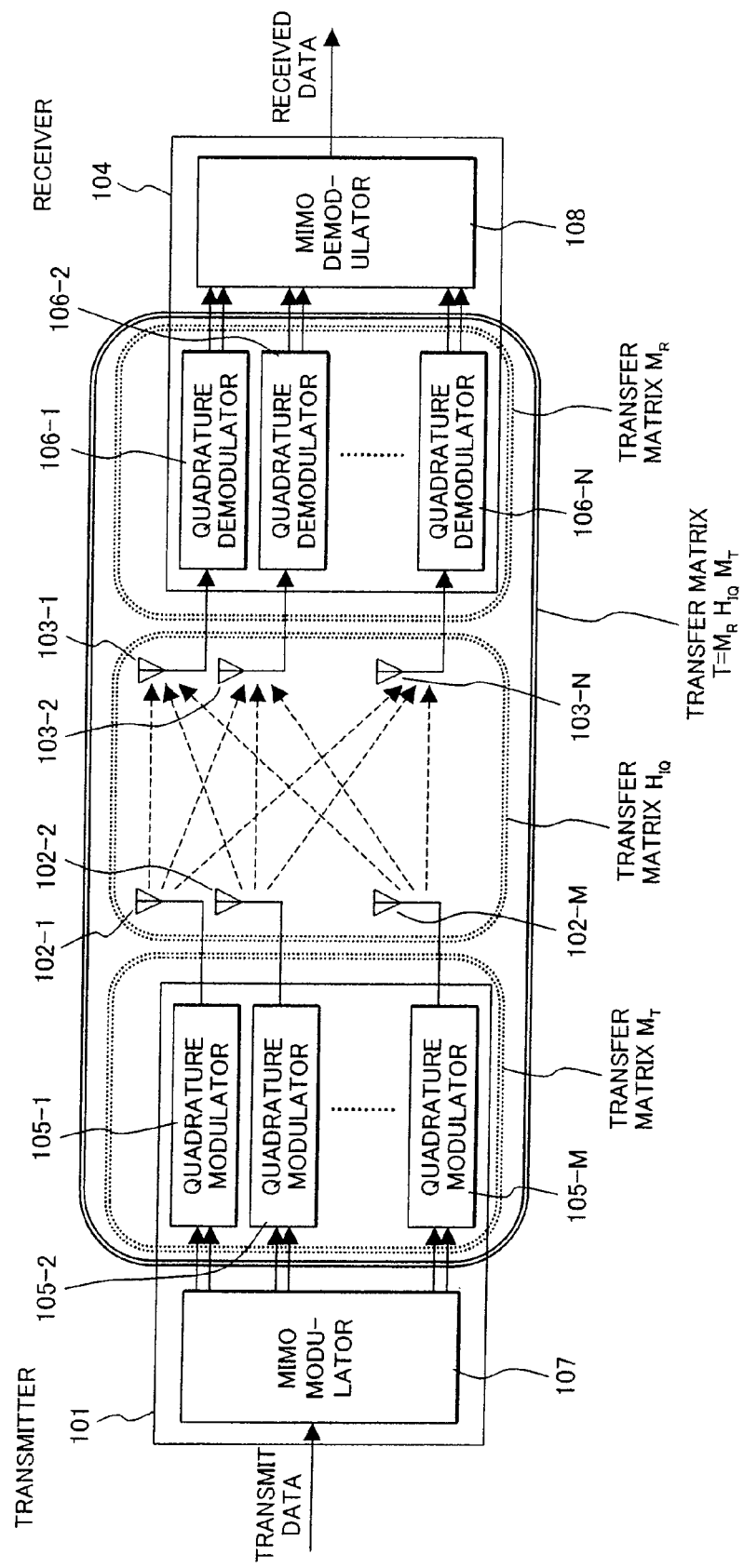
FIG. 4 is a diagram illustrating a configuration of a data communication system and a matrix representing a transfer matrix according to the first embodiment of the present invention.
Figure 5:
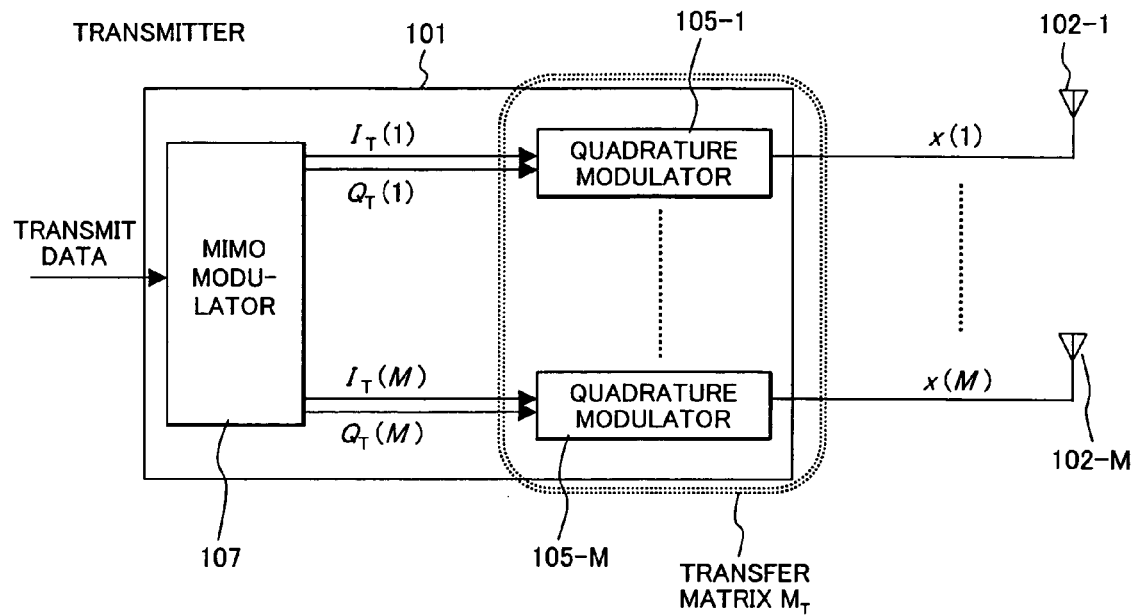
FIG. 5 is a diagram illustrating only a transmitter shown in FIG. 4.
Figure 6:
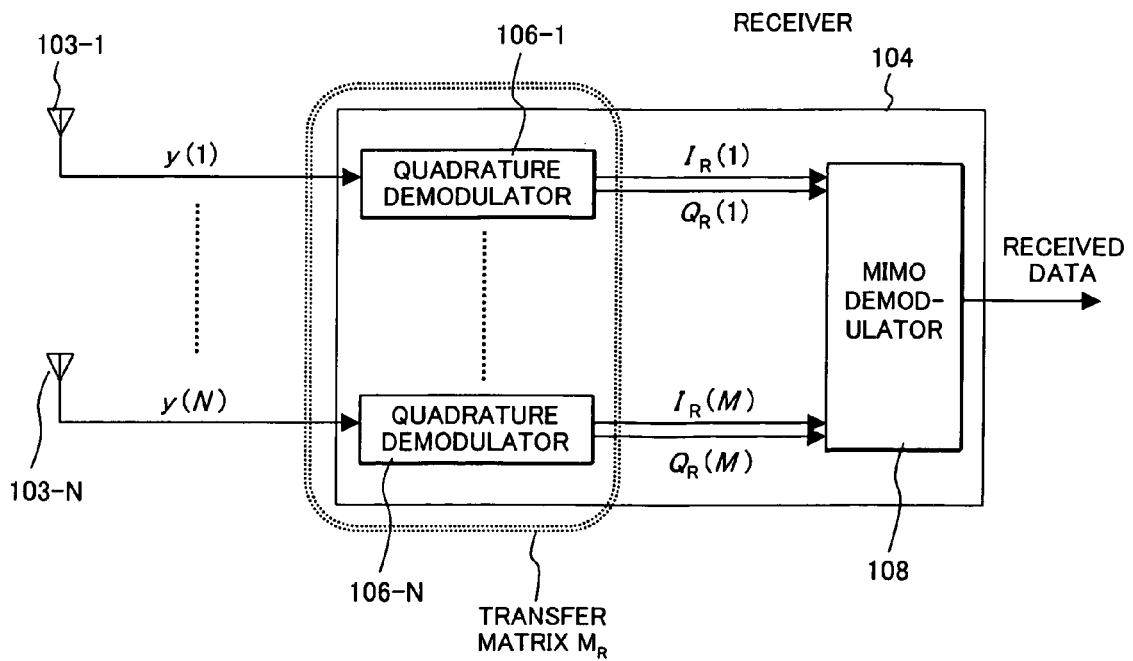
FIG. 6 is a diagram illustrating only a receiver shown in FIG. 4.

FIG. 4 is a diagram illustrating a configuration of a data communication system and a matrix representing a transfer matrix according to the first embodiment of the present invention. FIG. 5 is a diagram illustrating only a transmitter shown in FIG. 4. FIG. 6 is a diagram illustrating only a receiver shown in FIG. 4.

Figure 7:
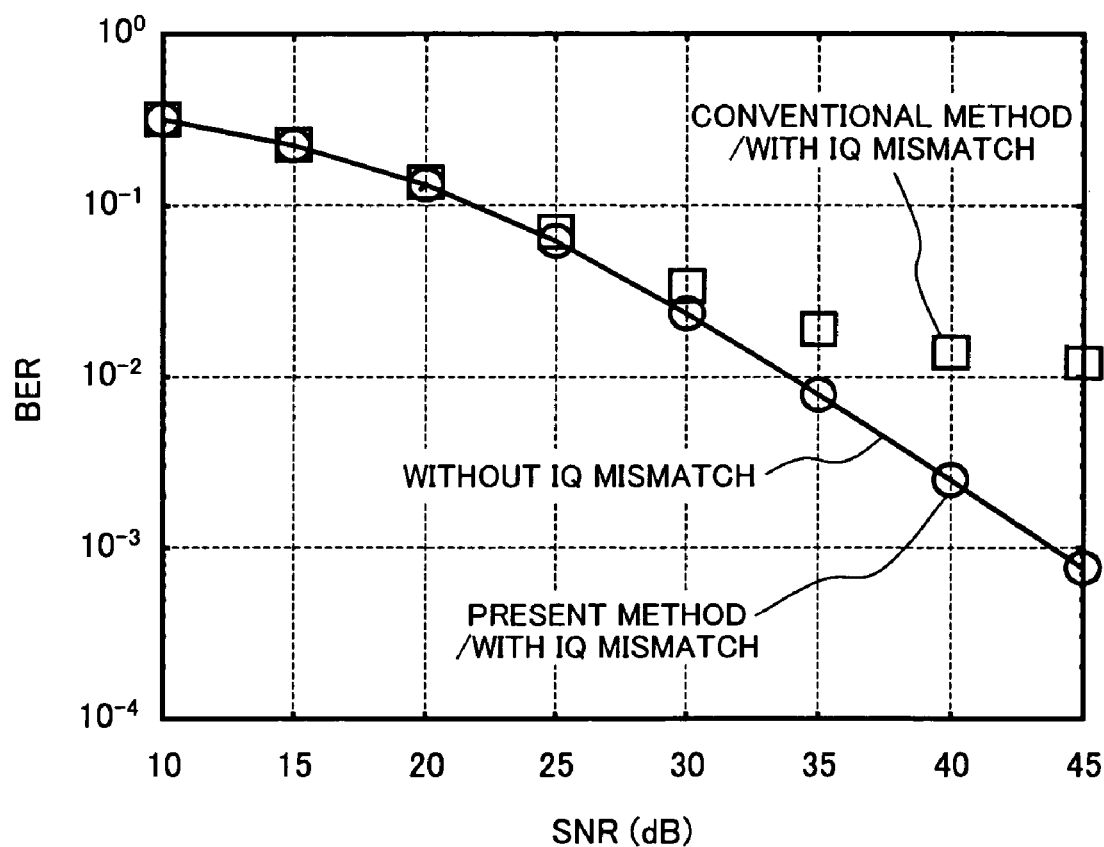
FIG. 7 is a graph comparatively showing SNR vs. BER characteristics of communication methods according to the prior art and the present invention.

FIG. 7 is a graph comparatively showing SNR vs. BER characteristics of communication methods according to the prior art and the present invention.

In a MIMO transmitter 101 of an MIMO wireless data communication system according to the present invention, first, after processes such as serial-parallel conversion, error correction coding and interleaving in an MIMO modulator 107 is carried out, a signal is then converted to a complex number expression. Here, a MIMO encoding is carried out and complex signals as many as the number of transmission antennas are output. Since a complex signal is expressed by two components of an in-phase component and a quadrature component, an output of two components exist for each complex signal. In a quadrature modulator 105, the complex signal is converted to a signal in which the center frequency will be the wireless wave frequency, and the signal is output by using M transmission antennas 102.

In the receiver, the signal received at N reception antennas 103 is converted to a baseband signal by a quadrature demodulator in a MIMO receiver 104, and a complex signal comprising two in-phase and quadrature components is delivered to a MIMO demodulator 108. In the MIMO demodulator 108, MIMO decoding is executed on as many complex signals as the number of the reception antennas, and thereafter, data is restored via de-interleaving, decoding of an error correction code and parallel-serial conversion.

Here, a transmission signal vector and a reception signal vector in MIMO transmission shall be real-number vectors, the transmission signal vector shall be a vector having the number of elements 2M comprising in-phase and quadrature components of M complex signals, the reception signal vector shall be a vector having the number of elements 2N comprising in-phase and quadrature components of N complex signals, and the transfer matrix T shall be a real matrix comprising 2N rows and 2M columns. The MIMO encoding executed in the MIMO modulator 107 and the MIMO decoding executed in the MIMO demodulator 108 are carried out based on the above-stated transfer matrix T. Since conversion MT of a signal caused by IQ mismatch that occurs in the quadrature modulator and the quadrature demodulator are included in the transfer matrix T, it is also possible to compensate IQ mismatch in the MIMO encoding and demodulation processes.

FIG. 5 illustrates only the transmitter shown in FIG. 4, wherein in-phase and quadrature signals that are output from the MIMO modulator 107 in association with a transmission antenna 102-*i* and input to a quadrature modulator 105-*i* shall be $I_T(i)$ and $Q_T(i)$, respectively, and a signal that is output by an antenna 102-*i* from the quadrature modulator 105-*i* shall be x(i). Where amplitude mismatch of the quadrature modulator 105-*i* is $G_T(i)$ and phase mismatch is $\theta_T(i)$, the relationship of the following equations 5 and 6 holds between $I_T(i)$, $Q_T(i)$ and x(i):

$$\begin{pmatrix} \mathrm{Re}(x(i)) \\ \mathrm{Im}(x(i)) \end{pmatrix} = m_T(i) \begin{pmatrix} I_T(i) \\ Q_T(I) \end{pmatrix} \quad \text{(Equation 5)}$$

$$m_T(i) = \begin{pmatrix} \cos(\theta_T(i)/2) & -\sin(\theta_T(i)/2) \\ -\sin(\theta_T(i)/2) & \cos(\theta_T(i)/2) \end{pmatrix} \begin{pmatrix} \sqrt{G_T(i)} & 0 \\ 0 & 1/\sqrt{G_T(i)} \end{pmatrix} \quad \text{(Equation 6)}$$

Therefore, the transfer matrix $M_T$ can be expressed in a 2M-row-2M-column real matrix of the following (Equation 7):

$$M_T = \begin{pmatrix} m_T(1) & & & O \\ & m_T(2) & & \\ & & \ddots & \\ O & & & m_T(M) \end{pmatrix} \quad \text{(Equation 7)}$$

On the other hand, FIG. 6 illustrates only the receiver shown in FIG. 4. Here, a signal that is received by a reception antenna 103-$j$ and input to a quadrature demodulator 106-$i$ shall be y(j), and in-phase and quadrature signals that are output from a quadrature demodulator 106-$j$ and input to the MIMO demodulator 108 shall be $I_R(j)$ and $Q_R(j)$, respectively. In addition, where amplitude mismatch of the quadrature demodulator 106-$j$ is $G_R(j)$ and phase mismatch is $\theta_R(j)$, the relationship of the following equations 8 and 9 holds between y(j) and, $I_R(j)$ and $Q_R(j)$:

$$\begin{pmatrix} I_R(j) \\ Q_R(j) \end{pmatrix} = m_R(j) \begin{pmatrix} \operatorname{Re}(y(j)) \\ \operatorname{Im}(y(j)) \end{pmatrix} \quad \text{(Equation 8)}$$

$$m_R(j) = \begin{pmatrix} \cos(\theta_R(j)/2) & -\sin(\theta_R(j)/2) \\ -\sin(\theta_R(j)/2) & \cos(\theta_R(j)/2) \end{pmatrix} \begin{pmatrix} \sqrt{G_R(j)} & 0 \\ 0 & 1/\sqrt{G_R(j)} \end{pmatrix} \quad \text{(Equation 9)}$$

Therefore, the transfer matrix $M_R$ can be expressed in a 2N-row-2N-column real matrix of the following equation 10:

$$M_R = \begin{pmatrix} m_R(1) & & & O \\ & m_R(2) & & \\ & & \ddots & \\ O & & & m_R(N) \end{pmatrix} \quad \text{(Equation 10)}$$

Figure 1:
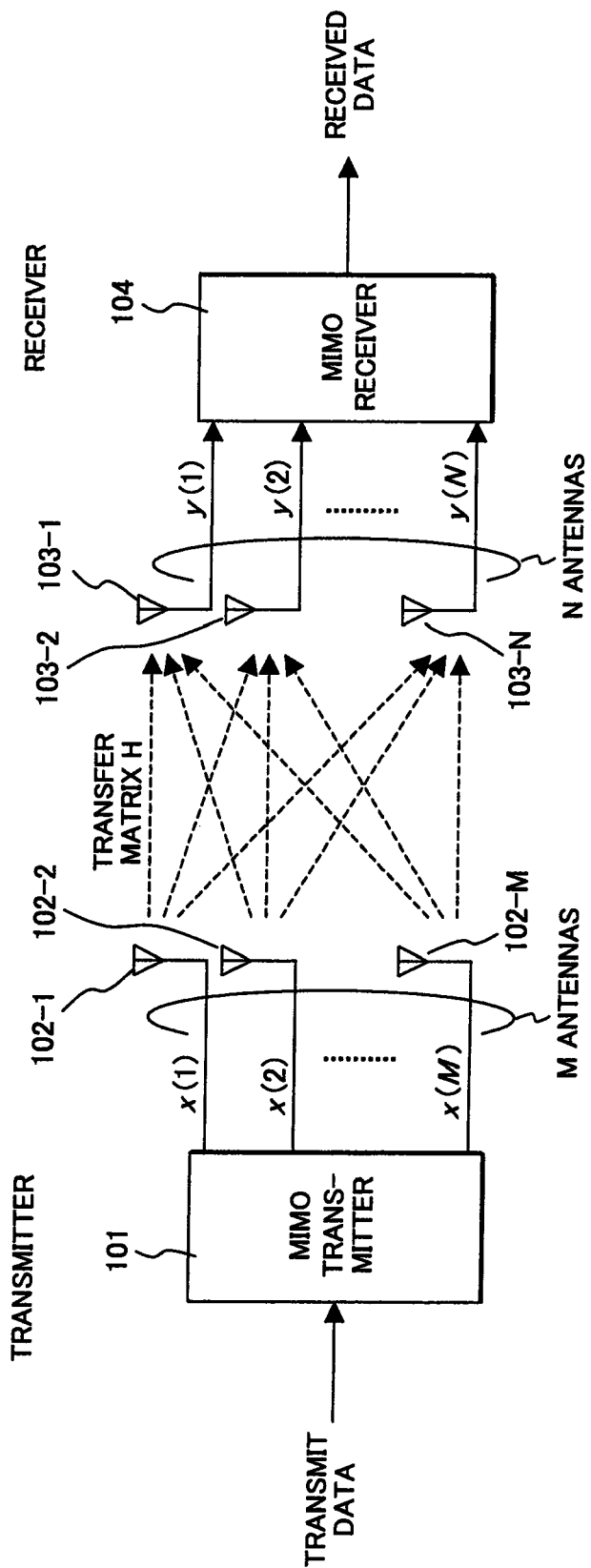
FIG. 1 is a diagram describing the principle of a general MIMO system.
Figure 2:
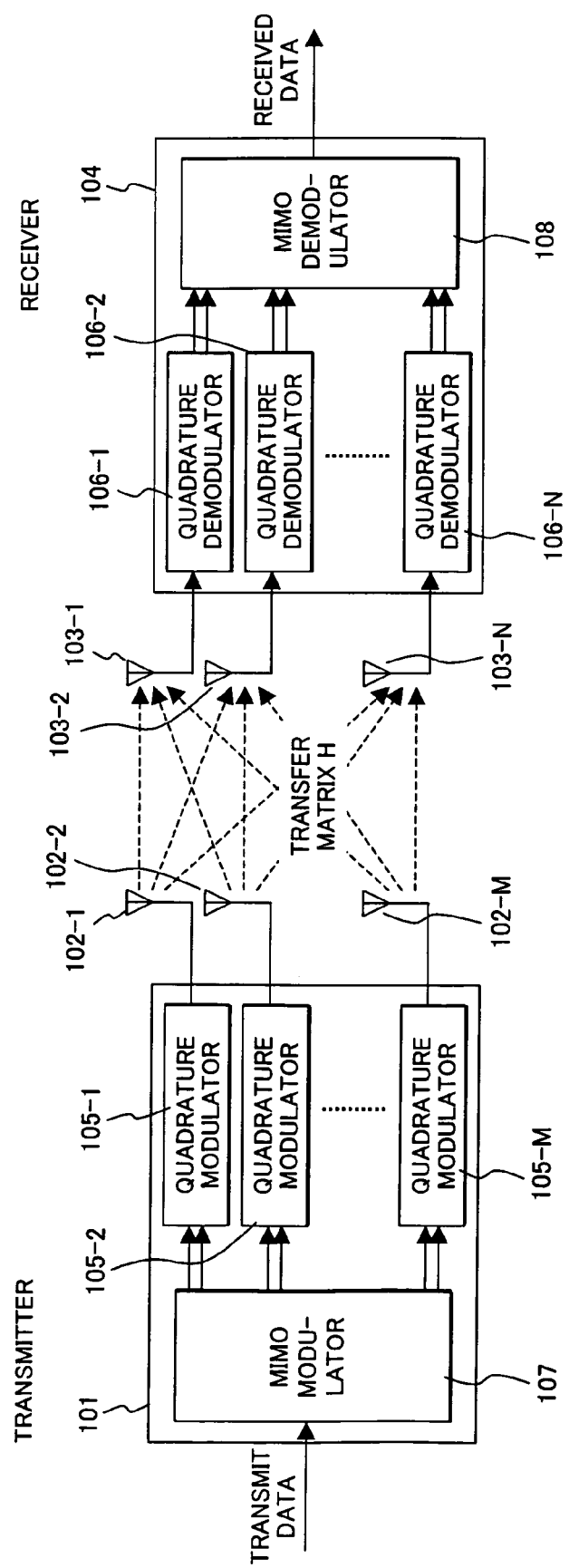
FIG. 2 is a demonstrative diagram of a quadrature modulator and a quadrature demodulator in a MIMO transmitter and a MIMO receiver, respectively, according to the prior art shown in FIG. 1.
Figure 3:
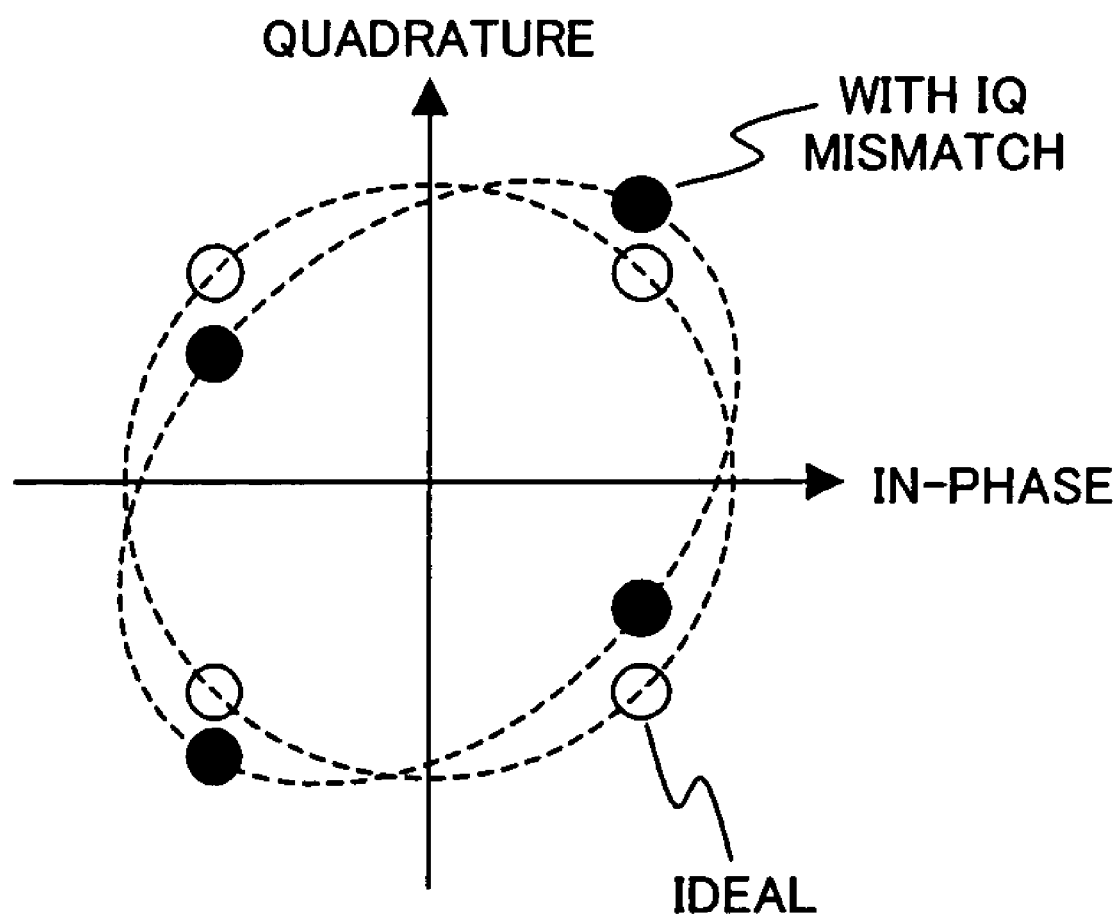
FIG. 3 is a diagram showing distortion of a transmission signal caused by IQ mismatch on a constellation of a QPSK modulation signal.

Further, the following relationship is available between the transfer matrix H that is expressed by an N-row-M-column complex matrix shown in FIG. 2 and the transfer matrix $H_{IQ}$ that is expressed by a 2N-row-2M-column real matrix shown in FIG. 5. The $H_{ji}$ which is a (j, i) component of H shows a transfer coefficient of a complex signal from the transmission antenna 102-$i$ to the reception antenna 103-$j$, and the relationship between the transmission signal x(i) and the reception signal y(j) is expressed in terms of in-phase and quadrature components, the following Equations 11 and 12 can be obtained:

$$\begin{pmatrix} \operatorname{Re}(y(j)) \\ \operatorname{Im}(y(j)) \end{pmatrix} = h_{ji} \begin{pmatrix} \operatorname{Re}(x(i)) \\ \operatorname{Im}(x(i)) \end{pmatrix} \quad \text{(Equation 11)}$$

$$h_{ji} = \begin{pmatrix} \operatorname{Re}(H_{ji}) & -\operatorname{Im}(H_{ji}) \\ \operatorname{Im}(H_{ji}) & \operatorname{Re}(H_{ji}) \end{pmatrix} \quad \text{(Equation 12)}$$

Therefore, the transfer matrix $H_{IQ}$ can be expressed in a 2N-row-2M-column matrix of the following (Equation 13):

$$H_{IQ} = \begin{pmatrix} h_{11} & h_{12} & \cdots & h_{1M} \\ h_{21} & h_{22} & & \\ \vdots & & \ddots & \vdots \\ h_{N1} & & \cdots & h_{NM} \end{pmatrix} \quad \text{(Equation 13)}$$

As stated above, it is possible that the transfer matrix T shown in FIG. 4 can be expressed by using $M_R$, $H_{IQ}$ and $M_T$, thereby enabling to capture signal conversion by using IQ mismatch of the quadrature modulator 106 and the quadrature demodulator 106 into a transfer matrix. More specifically, it is possible that a training signal is transmitted before data transmission to obtain the transfer matrix T, and when MIMO encoding and demodulation are executed by using the transfer matrix T, IQ mismatch can be compensated at the same time. Here, if the number of transmission antennas is equal to that of reception antennas, it is possible to obtain the in-phase component and the quadrature component to be input to the MIMO demodulator 108 by using equation 2 and obtaining an inverse matrix of the transfer matrix T.

Further, even if the number of transmission antennas is unequal to that of reception antennas, it is possible to obtain an in-phase component and a quadrature component to be input to the MIMO demodulator 108 by using the methods shown in equations 3 and 4.

Learning of the transfer matrix T by using a training signal does not need to obtain $M_T$, $M_R$ and $H_{IQ}$ individually, but it is required only to learn each element of the transfer matrix T. It should be noted that a method for giving preferable signal points on constellation will be described later.

According to the embodiment, it is possible to compensate IQ mismatch that occurs in a quadrature modulator in a transmitter and a quadrature demodulator in a receiver by applying MIMO encoding and demodulation in a MIMO transmission system. In addition, since it is possible to suppress BER deterioration caused by IQ mismatch more effectively compared to a case where conventional MIMO transfer technology is applied, digital data communication with a higher transmission rate than ever is enabled.

FIG. 7 specifically illustrates the above description in terms of comparison between SNR vs. BER characteristics of a conventional system and the system of the present invention. This is comparison of simulation results for a case where a 64QAM signal is MIMO-transmitted under a ZF system by using four transmission antennas and four reception antennas.

Amplitude mismatches of four quadrature modulators are respectively set at 1.03, 0.98, 1.05 and 1.01, phase mismatches thereof are respectively set at 4°, 2°, 0° and −3°, amplitude mismatches of the four quadrature modulators are respectively set at 1.05, 0.96, 1.01 and 1.03, and phase mismatches thereof are respectively set at 3°, −2°, −1° and 1°. The solid line shows a case without IQ mismatch. For a conventional system shown with □ (square) marks, BER does not become smaller than $10^{-2}$ due to an effect of IQ mismatch. In contrast, the system according to the present invention is scarcely affected by IQ mismatch as shown by ○ (circle) marks, and BER almost equivalent to the case without IQ mismatch can be obtained. As stated above, FIG. 7 shows that the method of the embodiment is capable of suppressing deterioration in BER caused by IQ mismatch.

As it can be understood from the above-stated embodiment, the data communication method of the present invention provides greater effects in data communication using a modulation system having a large number of level. The reason for this is that, with a conventional system, BER deterioration caused by IQ mismatch becomes greater as the number of levels becomes larger. In addition, significant effects can be expected in a data communication system in which the number of modulation levels is changed according to SNR during data communication. Such data communication system includes, for example, a wireless LAN system that is standardized by the IEEE 802.11n. When SNR is high, such systems intend to increase the transmission rate by increasing the number of levels. However, as described in the above-stated non-patent reference 2, since the effect of IQ mismatch deteriorates BER, a problem arises in that the transmission rate will not become higher. This problem can be avoided when the data communication method according to the present invention is applied.

[Second Embodiment]

Next, a method for giving a training signal in the MIMO data communication of the present invention will be described with reference to FIGS. 8 to 11.

Figure 8:
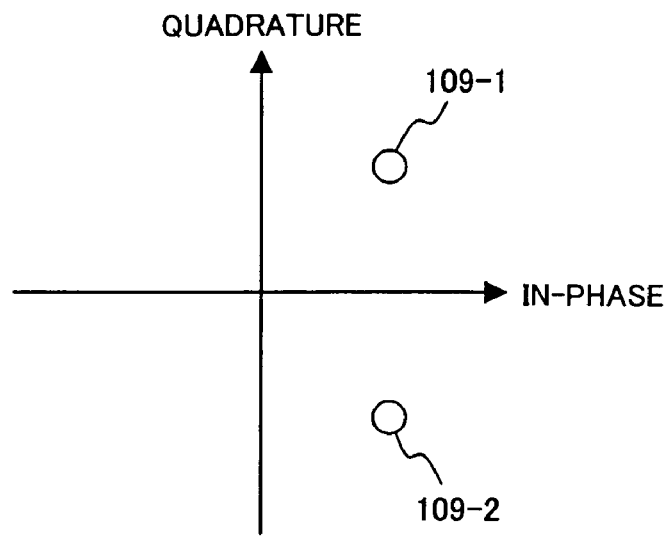
FIG. 8 is a diagram illustrating a constellation example of a training signal having two linearly-independent signal points.
Figure 9:
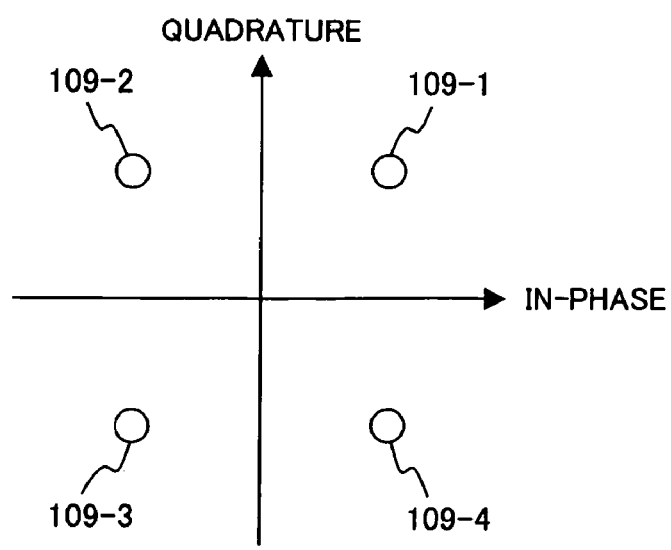
FIG. 9 is a diagram illustrating a constellation example of a training signal on a QPSK modulation signal.
Figure 10:
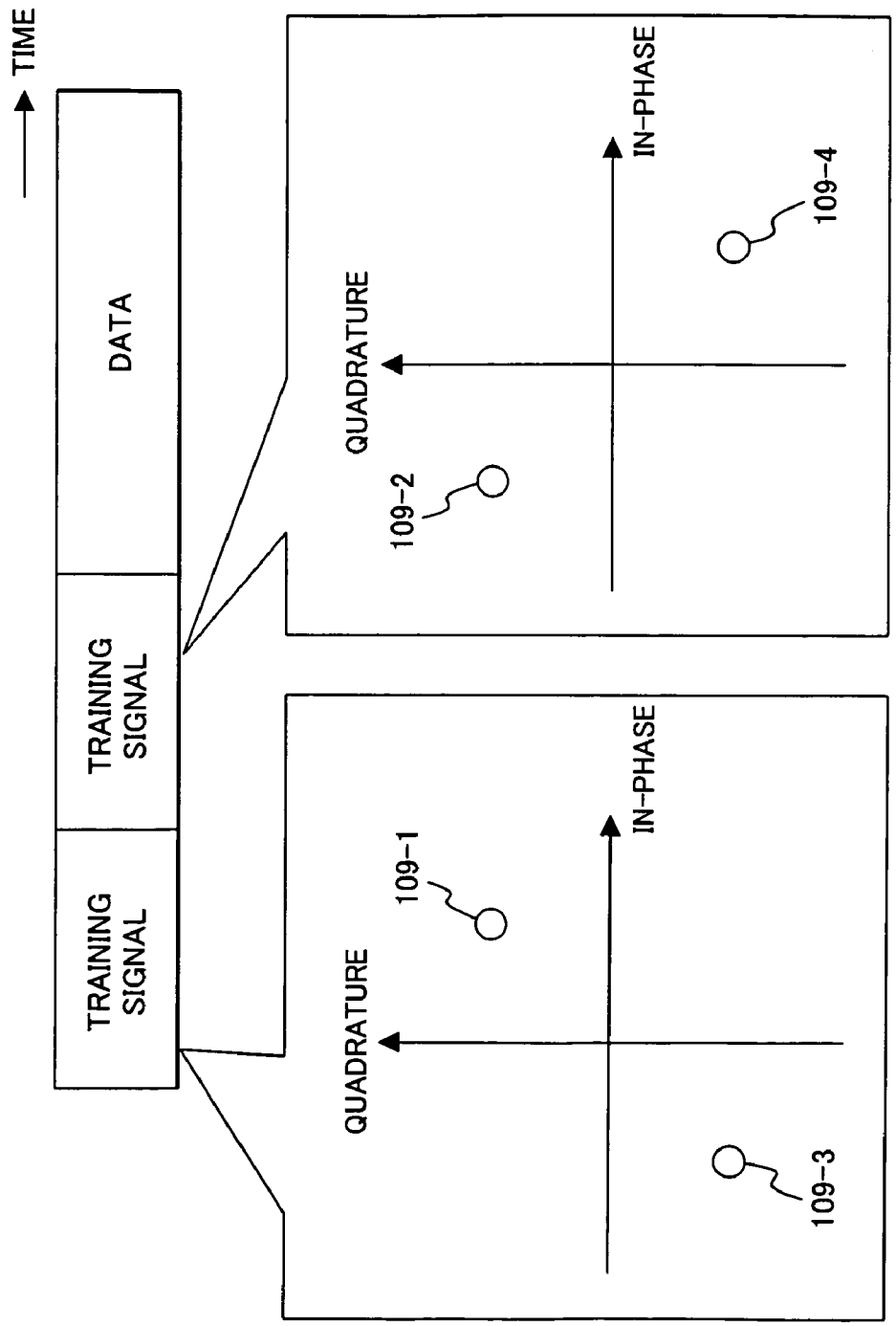
FIG. 10 is a diagram illustrating the configuration relationship between a training signal and data and a method for giving a constellation on a BPSK modulation signal (No. 1)
Figure 11:
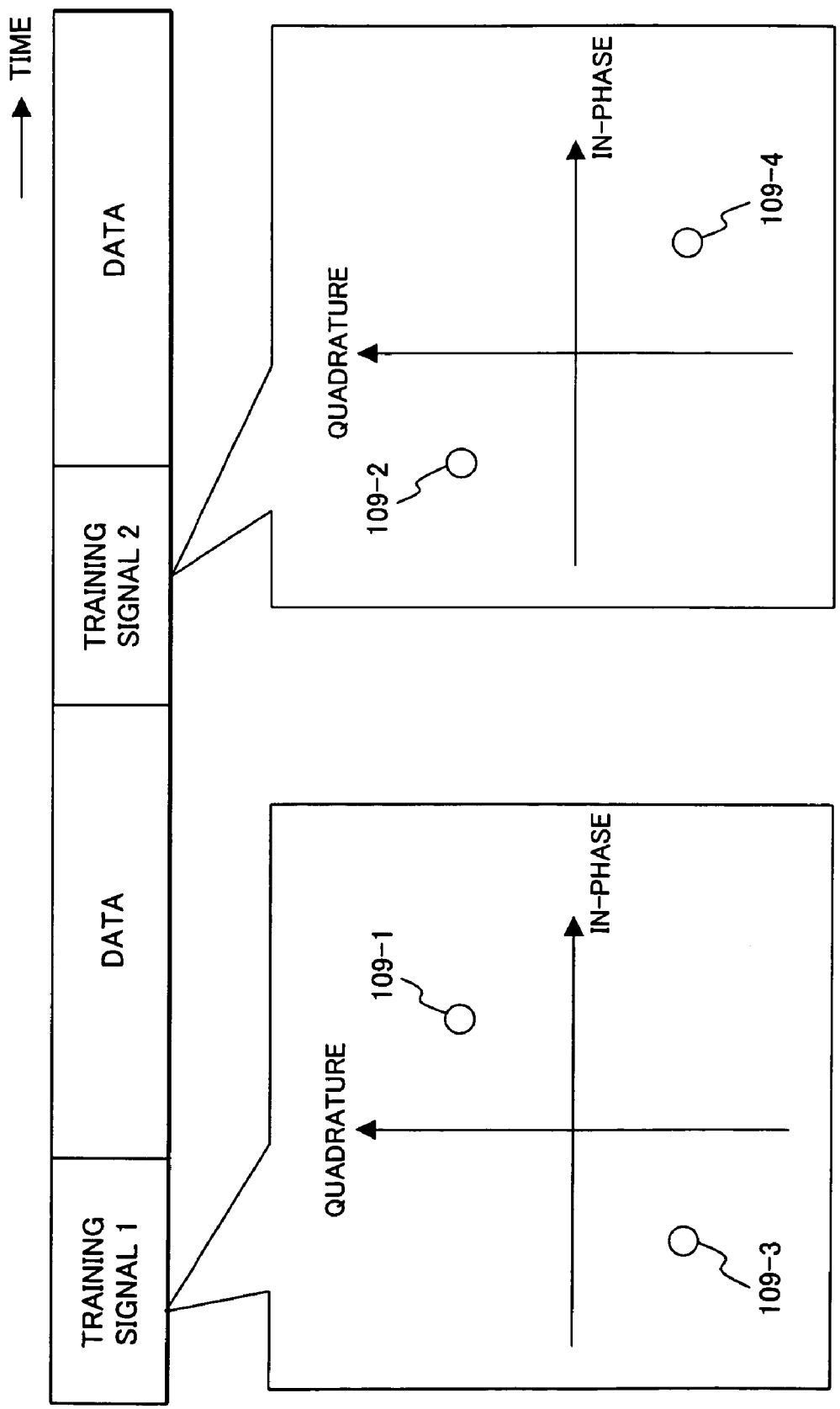
FIG. 11 is a diagram illustrating the configuration relationship between a training signal and data and a method for giving a constellation on BPSK modulation signal (No. 2).

FIG. 8 is a diagram illustrating a constellation example of a training signal having two linearly-independent signal points. FIG. 9 is a diagram illustrating a constellation example of a training signal on a QPSK modulation signal. FIGS. 10 and 11 are diagrams illustrating configuration relationship between a training signal and data and a method for giving a constellation on a BPSK (Binary Phase Shift Keying) modulation signal.

According to the method of the present invention, since a transfer matrix in MIMO transfer is represented by dividing the matrix into an in-phase component and a quadrature component of a complex signal, it is necessary to set two or more signal points that are linearly independent on the constellation of a training signal of the transfer matrix. For example, since signal points 109-1 and 109-2 on a constellation shown in FIG. 8 are linearly independent, it is possible to use the signals that are configured by the constellation as training signals of the present invention.

In addition, it is also possible to use a QPSK modulation signal shown in FIG. 9 for the training signal. The signal point 109-1 and a signal point 109-3 are linearly dependent and the signal point 109-2 and a signal point 109-4 are also linearly dependent. However, since the signal points 109-1 and 109-3, and the signal points 109-2 and 109-4 are linearly independent, it is possible to configure the training signals of the present invention by using a QPSK modulation signal.

Further, as shown in FIG. 10, it is also possible to divide a training signal into two training signals in the direction of time and use a BPSK modulation signal in which phases are different from each other by 90 degrees for the two training signals. The signal points 109-1 and 109-3 of the first-half training signal are linearly dependent, and the signal points 10902 and 109-4 of the second-half training signal are also linearly dependent. However, since the fist-half and the second-half signals are different in phase from each other by 90 degrees, the first-half and the second-half training signal become linearly independent. Therefore, even for the constellation shown in FIG. 10, the signals can be used as a training signal of the present invention.

In addition, the training signals may be configured with a BPSK modulation signal, whereby the phase of the BPSK modulation signal is made to rotate by 90 degrees each time the training signal is output. The training signals may not be placed side-by-side in the direction of time. Further, a signal that is different from training signals such as data may be sandwiched between the two training signals. The signal points 109-1 and 109-3 of a training signal 1 configured with a BPSK modulation signal shown in FIG. 11 are linearly dependent, and the signal points 109-2 and 109-4 of a training signal 2 are also linearly dependent. However, since the training signal 1 and the training signal 2 are different in phase from each other by 90 degrees, the training signals 1 and 2 will be linearly independent. Therefore, the training signals can be used as training signals of the present invention.

It should be noted that, since the conventional wireless LAN uses a training signal configured with a BPSK modulation signal, even for the new wireless LAN standards which will be standardized in the future, use of a training signal configured with a BPSK modulation signal is required to ensure backwards compatibility. Therefore, a training signal configured with BPSK as shown FIGS. 10 and 11 offers higher compatibility with use in a wireless LAN than the constellations shown in FIGS. 8 and 9.

The present invention can be applied to various other MIMO systems such as a ZF system, a maximum likelihood detection system, a time-space encoding system and an eigen mode transmission system. Further, the present invention can also be applied to mobile wireless communication such as cell phones, not limited to stationary wireless communication like a wireless LAN.

The quadrature modulation and the quadrature demodulation referred to in the present invention imply those that are carried out by analog systems. The quadrature modulation and the quadrature demodulation that are performed digitally are called "digital IF" in general, which are discriminated from narrowly-defined quadrature modulation and quadrature demodulation. The digital IF has an advantage that IQ mismatch does not occur, but it offers many technical problems in that performance demanded to an A/D converter or an D/A converter becomes stricter, for example. Therefore, at present, the digital IF has not been put into practical use in a wireless LAN, etc.

However, even when the digital IF is put into practical use in the future, if either of a transmitter or a receiver is configured with an analog type quadrature modulator or a quadrature demodulator, the problem of IQ mismatch would still be likely to occur. For this reason, the present invention is effective even for use with a wireless data communication system of an analog modulation type as well as a wireless data communication method in which the digital IF that is the above-stated digital modulation/demodulation system is mixed.

As stated above, according to the present invention, it is possible to provide an MIMO data communication system which can reduce IQ mismatch to be caused by MIMO communication using quadrature modulation and demodulation.

What is claimed is:

1. A wireless data communication system comprising:
   a transmitter having M transmission antennas; and
   a receiver having N reception antennas,
   wherein data communication is executed between said transmitter and said receiver,
   wherein said transmitter includes a modulator that modulates a transmission signal associated with each of the transmission antennas and a demodulator that demodulates a reception signal from each of the reception antennas,
   wherein said data communication is executed based on a real number signal which consists of in-phase components and quadrature components of said transmission signal and said reception signal,
   wherein training signal vectors consist of at least two signal vectors whose component vectors for each antenna are linearly-independent of each other,
   wherein based on a real number transmission signal vector which has 2M components, and a real number reception signal vector which has 2N components, an arithmetic operation is performed on a 2N-row-2M-column transfer matrix which shows a relationship between a transmission signal vector and a reception signal vector which each contain deviation in an in-phase component and deviation in a quadrature component that occur during a modulation process in said modulator and deviation in an in-phase component and deviation in a quadrature component that occur during a demodulation process in said demodulator, and
   wherein after said training signal vectors are transmitted, said transfer matrix is estimated by using received training signal vectors, according to data to be transmitted to said receiver from said transmitter, and an arithmetic operation is performed on the real number reception signal vector to be input to said demodulator based on said transfer matrix.

2. The wireless data communication system according to claim 1, wherein respective signal points are extracted from said training signal vectors, and said training signal vectors are configured by binary phase shift keying signals in which phases on constellations on said extracted signal points differ from each other by 90 degrees.

3. The wireless data communication system according to claim 1, wherein said training signal vectors are configured by binary phase shift keying, respectively, and a phase of a signal point on a constellation of each training signal vector is rotated by 90 degrees each time said training signal vector is transmitted.

4. A wireless data communication method for executing data communication between a transmitter having M transmission antennas and a receiver having N reception antennas, said transmitter being a transmitter that modulates a transmission signal to each of said transmission antennas and transmits data from each of said transmission antennas, said receiver being a receiver that demodulates the reception signal from each of said reception antennas and extracts data, said data communication being executed based on real number signal which consists of in-phase components and quadrature components of said transmission signal and said reception signal, and said wireless data communication method comprising the steps of:

transmitting signal vectors consisting of at least two signal vectors whose component vectors for each antenna are linearly-independent of each other;

based on a real-number transmission signal vector which has 2M components, and a real-number reception signal vector which has 2N components, and an in-phase component and a quadrature component of N reception signal vectors, arithmetically operating a 2N-row-2M-column transfer matrix which shows a relationship between a transmission signal vector and a reception signal vector which each contain deviation in an in-phase component and deviation in a quadrature component that occur during a modulation process in a modulator and deviation in an in-phase component and deviation in a quadrature component that occur during a demodulation process in a demodulator;

after said training signal vectors are transmitted, estimating said transfer matrix by using received training signal vectors;

transmitting data from said transmission antennas to said reception antennas so as to transmit the data from said transmitter to said receiver; and arithmetically operating the real number reception signal vector to be input to said demodulator through data transmission based on said transfer matrix.

5. The wireless data communication method according to claim 4, wherein respective signal points are extracted from said training signal vectors, and said training signal vectors are configured by binary phase shift keying signals in which phases on constellations on said extracted signal points differ from each other by 90 degrees.

6. The wireless data communication method according to claim 4, wherein said training signal vectors are configured by binary phase shift keying and a phase of a signal point on a constellation of each training signal vector is rotated by 90 degrees each time said training signal vector is transmitted.

* * * * *